(12) United States Patent
Benney et al.

(10) Patent No.: US 6,328,263 B1
(45) Date of Patent: Dec. 11, 2001

(54) PARACHUTE ASSEMBLY

(75) Inventors: Richard J. Benney, Stow, MA (US);
Glen J. Brown, Santa Cruz, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/867,030

(22) Filed: May 29, 2001

(51) Int. Cl.$^7$ ............................. B64D 17/00; B64D 17/14
(52) U.S. Cl. ......................... 244/142; 244/152; 244/147
(58) Field of Search ................................. 244/142, 145, 244/152, 138 A, 147

(56) References Cited

U.S. PATENT DOCUMENTS

| | | | |
|---|---|---|---|
| 2,745,615 | 5/1956 | Fogal | 244/145 |
| 3,104,856 | 9/1963 | Knacke et al. | 244/145 |
| 3,602,462 | 8/1971 | Slater et al. | 244/145 |
| 4,834,323 | 5/1989 | Reuter | 244/145 |
| 5,678,788 * | 10/1997 | Hetzer et al. | 244/152 |
| 5,839,695 | 11/1998 | Puskas | 244/145 |
| 5,893,536 * | 4/1999 | Lee et al. | 244/149 |
| 6,131,856 * | 10/2000 | Brown | 244/152 |

* cited by examiner

Primary Examiner—J. Woodrow Eldred
(74) Attorney, Agent, or Firm—Vincent J. Ranucci

(57) ABSTRACT

A parachute assembly includes a canopy central panel of square configuration, a rectangular canopy outboard arm fixed to each side edge of the canopy central panel and extendible outwardly therefrom to form a cross configuration, each of the canopy outboard arms having two outboard corners. A suspension line is fixed to each of the outboard corners, the suspension lines being of equal length for initial deployment of the parachute assembly. A first suspension line fixed to a canopy first outboard arm at a corner thereof is extendible to cause a spinning motion and increased rate of descent of the parachute. A second suspension line fixed to a canopy second outboard arm at a corner thereof closer to the first suspension line is extendible to influence the spinning motion, rate of descent, and horizontal velocity and direction.

5 Claims, 1 Drawing Sheet

PARACHUTE ASSEMBLY

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

The invention relates to parachutes and is directed more particularly to a cross parachute exhibiting improved accuracy in landings.

2. Description of the Prior Art

There is a need for accurate airdrops of goods, such as disaster relief supplies and military supplies, by use of relatively inexpensive airdrop devices. Parafoils offer potential for accuracy, but are expensive and are complex to rig. Cross parachutes have been found to be the least expensive airdrop vehicles, but are lacking in pin-point accuracy.

It is therefore deemed desirable to provide a cross parachute which is sufficiently controllable to provide for accurate positioning of airdropped supplies.

SUMMARY OF THE INVENTION

An object of the invention is, therefore, to provide a cross parachute exhibiting improved controllability in descent and accuracy in landing.

With the above and other objects in view, a feature of the present invention is the provision of a parachute assembly comprising a canopy central panel of substantially square configuration and a rectangularly configured canopy outboard arm fixed to each side edge of the canopy central panel and extendible outwardly therefrom to form a cross configuration, each of the canopy outboard arms having two outboard corners. A suspension line is fixed to each of the outboard corners, the suspension lines being of equal length for initial deployment of the parachute assembly. A first of the suspension lines fixed to a first of the canopy outboard arms at a corner thereof is extendible. A second of the suspension lines fixed to a second of the canopy outboard arms at a corner thereof closer to the first suspension line is extendible. Means are provided for extending the first suspension line after deployment of the parachute assembly to initiate a spinning motion in, and to increase descent velocity of, the parachute assembly, and for extending the second suspension line, after extension of the first extension line, to selectively influence the spinning motion, the descent velocity, and horizontal velocity and direction.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention, from which its novel features and advantages will be apparent.

DESCRIPTION OF THE PREFERRED EMBODIMENT

Figure 1:
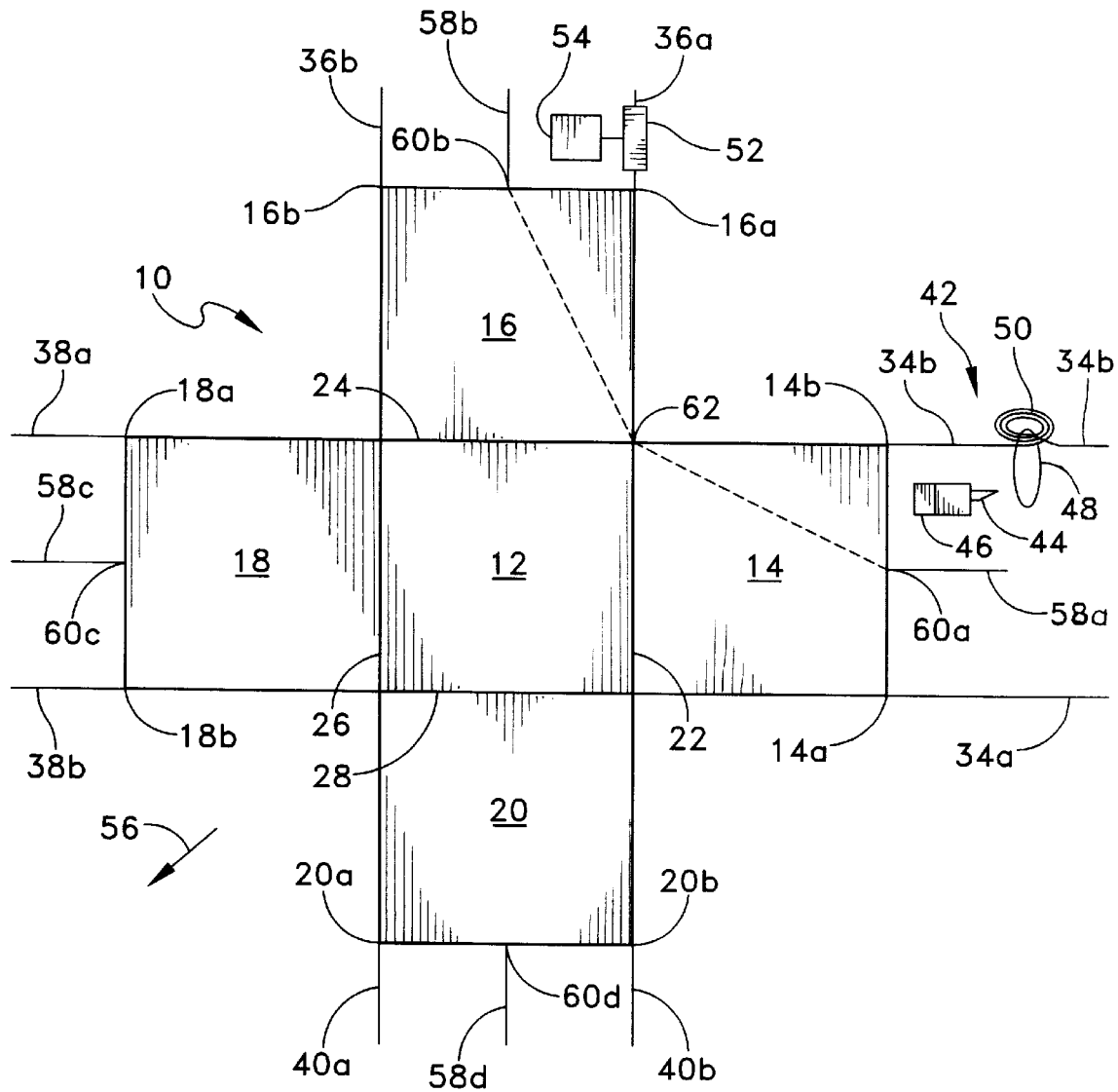
FIG. 1 is a diagrammatic top planar view of one form of parachute assembly illustrative of an embodiment of the invention.

Referring to FIG. 1, it will be seen that an illustrative cross parachute canopy 10 includes a canopy central panel 12 of substantially square configuration. A rectangularly configured canopy outboard arm 14, 16, 18, 20 is fixed to each side edge 22, 24, 26, 28 of the canopy central panel 120 The canopy arms 14, 16, 18, 20 are extendible outwardly from the canopy central panel 12 to form a cross configuration, as shown in FIG. 1.

Each of the canopy outboard arms 14, 16, 18, 20 is provided with two outboard corners 14a and 14b, 16a and 16b, 18a and 18b, and 20a and 20b. A suspension line 34a, 34b, 36a, 36b, 38a, 38b, 40a, 40b is fixed to each of the corners. The suspension lines are of equal length for initial deployment of the parachute.

One of the suspension lines, such as suspension line 34b, is extendible by means 42 known in the art. Typically, such means 42 include a cutter 44, often activated by a pyrotechnic device 46 which, upon ignition, moves the cutter 44 through a line 48 which captures a length 50 of the suspension line 34b. Cutting the capture line 48 releases the captured length 50 of suspension line 34b, increasing the overall length of the suspension line 34b. When the suspension line 34b is thusly lengthened, the "raising" of the corner 14b relative to the other corners induces a clockwise spinning motion, when viewed from above, as in FIG. 1. The parachute thereupon descends at a faster rate and with less horizontal drift.

A second of the suspension lines, line 36a, fixed to the corner 16a of canopy arm 16 is also extendible by means known in the art An actuator 52 is operable to lengthen the suspension line 36a. The actuator 52 operates responsive to a computer 54 which is provided with a Global Positioning System or other topography reading capability. Thus, the computer is adapted to "read" the terrain below and provide corrective signals to the actuator 52.

To stop or slow the rapid descent, and to influence the horizontal velocity and direction, the actuator 52 increases the length of the suspension line 36a. To stabilize the parachute, the length of suspension line 36a is made equal to the length of suspension line 34b. Thereupon, the spinning motion ceases and the parachute moves downwardly with a horizontal "drive", or velocity component in the direction of arrow 56. The length of the suspension line 36a also effects turning and direction of glide. By extending the line 36a less than the extension of the line 34b, the spinning motion will continue at a slower pace and the rapid descent will be slowed. By extending the line 36a more than the extension of the line 34b, the spinning will reverse and become counter-clockwise.

The actuation of the pyrotechnic device 46 typically is started by the opening of the parachute or by a static line. The actuation of the actuator 52 is pre-programmed and; once the parachute is deployed, is automatic. Alternatively, the actuator 52 can be controlled by a ground operator who transmits radio signals to the actuator.

Referring again to FIG. 1, there is shown for illustrative purposes a cross parachute having twelve suspension lines, the aforementioned lines 34a–40b, and suspension lines 58a, 58b, 58c and 58d attached to the canopy arms 14, 16, 18, 20, respectively, at mid-points 60a, 60b, 60c and 60d.

In operation, when the suspension line 34b is lengthened, the canopy arm 14 lifts upwardly, generally along a line shown in phantom in FIG. 1 and extending from the mid-point 60*a* to the juncture 62 of canopy arms 14 and 16. When the suspension line 36*a* is lengthened, the canopy arm 16 lifts upwardly, generally along a line shown in phantom in FIG. 1 and extending from the junction 62 to the mid-point 60*b*.

There is thus provided a cross parachute of relatively inexpensive construction and which can be dropped and landed with a high degree of accuracy. In military applications, the parachute assembly described herein provides the additional benefit of relatively short drop time resulting from the rapid descent, thereby providing a more difficult target to hit while the parachute and its payload are in the air.

It is to be understood that the present invention is by no means limited to the particular construction herein disclosed and/or shown in the drawings, but also comprises any modification or equivalent within the scope of the claims.

What is claimed is:

1. A parachute assembly comprising:

a canopy central panel of substantially square configuration;

a rectangularly configured canopy outboard arm fixed to each side edge of said canopy central panel and extendible outwardly therefrom to form a cross configuration, each of said canopy outboard arms having two outboard corners;

a suspension line fixed to each of the outboard corners, said suspension lines being of substantially equal length for initial deployment of said parachute assembly;

a first of said suspension lines fixed to a first of said canopy outboard arms, at a corner thereof, being extendible; and a second of said suspension lines fixed to a second of said canopy outboard arms at a corner thereof closer to said first suspension line being extendible;

means for extending said first suspension line after deployment of said parachute assembly to initiate a spinning motion in and to increase descent velocity of said parachute assembly; and means for extending said second suspension line after extension of said first extension line to selectively influence the spinning motion, the descent velocity, and horizontal velocity and direction.

2. The parachute assembly in accordance with claim 1 wherein said means for extending said first suspension line comprises a cutter assembly which upon activation releases a stored length of said first suspension line.

3. The parachute assembly in accordance with claim 2 wherein said cutter assembly comprises a pyrotechnic activator for activating a cutting blade which upon activation, releases the stored length of suspension line.

4. The parachute assembly in accordance with claim 3 wherein said means for extending said second suspension line comprises an actuator which upon actuation releases at least a portion of a stored length of said second suspension line.

5. The parachute assembly in accordance with claim 4 wherein said actuator is self-powered and is responsive to signals received to actuate the release of the second suspension line.

* * * * *